March 21, 1961   J. B. VAUGHAN   2,975,752
MACHINE FOR MAKING STABILIZED CAPSULES
Original Filed Oct. 23, 1957   2 Sheets-Sheet 1
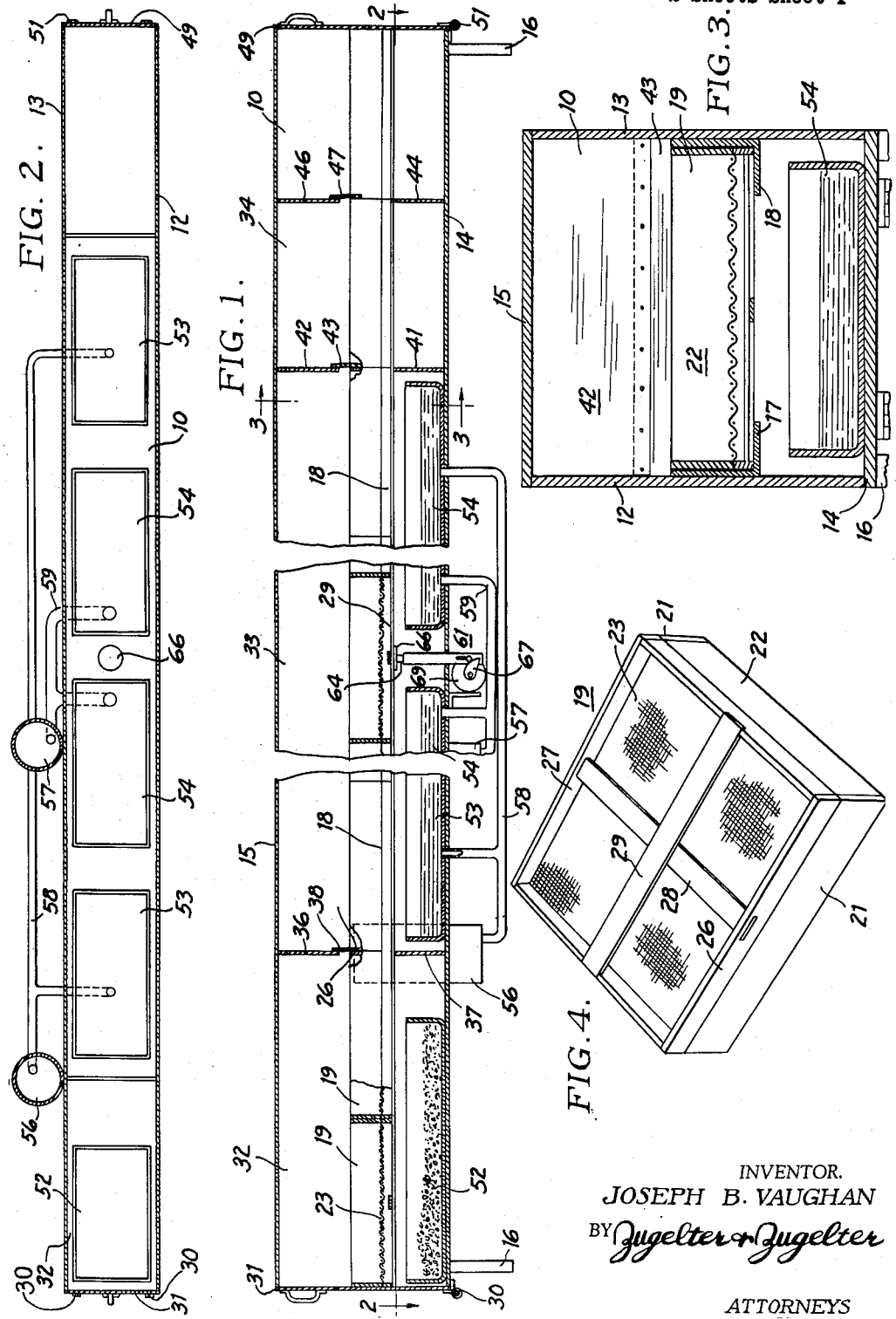
INVENTOR.
JOSEPH B. VAUGHAN
BY Jugelter & Jugelter
ATTORNEYS March 21, 1961 J. B. VAUGHAN 2,975,752
MACHINE FOR MAKING STABILIZED CAPSULES
Original Filed Oct. 23, 1957 2 Sheets-Sheet 2

INVENTOR.
JOSEPH B. VAUGHAN
BY Jugelter & Jugelter
ATTORNEYS

United States Patent Office 2,975,752
Patented Mar. 21, 1961

2,975,752
MACHINE FOR MAKING STABILIZED CAPSULES

Joseph B. Vaughan, Norwood, Ohio, assignor to Lloyd Brothers, Inc., Cincinnati, Ohio, a corporation of Ohio Original application Oct. 23, 1957, Ser. No. 691,976. Divided and this application June 2, 1958, Ser. No. 739,314

5 Claims. (Cl. 118—13)

This invention relates to the treatment of gelatin capsules to harden the surfaces thereof and to provide an enteric coating thereon. More particularly, this invention relates to an improved method and apparatus for treating gelatin capsules with formaldehyde to provide a stabilized, hardened, or enteric coating thereon. This is a division of my co-pending application Serial No. 691,976, filed October 23, 1957.

One of the common means of administering medicaments orally is to enclose the substance in a shell of gelatin in the form of what are known as "soft gelatin" capsules. These capsules vary in stability toward heat and humidity and when certain medicaments are enclosed, the capsules tend to deteriorate and permit the contents of the capsules to leak. This property of certain soft gelatin capsules results in a relatively unsatisfactory form of medication for the substance involved since capsule deterioration often results in both loss to the manufacturer and to the consumer who has purchased the item.

It is known that gelatin used in preparing the soft gelatin capsule shell will undergo a chemical reaction with formaldehyde. The compound so provided is insoluble in water and only slowly soluble in dilute acid or alkali. In the past, gelatin coated capsules have been treated by dipping in an aqueous solution of formaldehyde to render them enteric coated, i.e., to provide a coating which will resist the action of stomach fluids but permit eventual solution in the alkaline fluids of the intestinal tract. However, such methods of treating capsules have not been satisfactory, because, when such a gelatin coated tablet has been dipped in an aqueous solution of formaldehyde, the reaction is a progressive one and continues for a protracted period after the dipping and drying is completed, so that the properties of the final product can not be regulated.

I have found that, when soft gelatin capsules are treated with or exposed to an atmosphere of formaldehyde gas, a product can be formed which is stable and does not continue to change progressively. The capsules are rendered less subject to deterioration caused by heat and humidity. Furthermore, a truly enteric coating is accomplished which permits the capsules to pass through the stomach without disintegration to be disintegrated and absorbed in the alkaline intestinal region.

In my method, the gelatin capsules are treated to an atmosphere containing formaldehyde gas at a carefully controlled or predetermined relative humidity and for a predetermined and definite period of time. To accomplish my invention, thin layers of soft gelatin capsules are placed in trays in a closed chamber in which humidity is carefully regulated through a judicious choice of chemical baths contained in trays within the larger container. The space within this container is filled with formaldehyde gas by placing an open container of a solution of formaldehyde gas in water therein. After exposure for the predetermined period of time, the capsules are removed and the residual formaldehyde vapors remaining on the capsules are permitted to evaporate by exposure to air.

While the capsules are exposed to the formaldehyde gas, the trays of capsules are agitated or stirred in order to insure reaction at all surfaces of the capsules. The trays have screened bottoms on which the capsules are supported so that the vapors can readily reach all portions of the surfaces of the capsules.

The above and other objects and features of this invention will be apparent to those skilled in the art to which this invention pertains from the following detailed description and the drawings, in which:

Figure 1 is a view partly in side elevation and partly in lengthwise section of a machine for treating capsules constructed in accordance with an embodiment of this invention;

Fig. 2 is a view in section, taken on the line 2—2 in Fig. 1;

Fig. 3 is a view in section, taken on the line 3—3 in Fig. 1;

Fig. 4 is a perspective view of one of a plurality of capsule-holding trays which form a part of the device, the view being directed toward the lower side of the tray;

In the following detailed description and the drawings, like reference characters indicate like parts.

Figure 5:
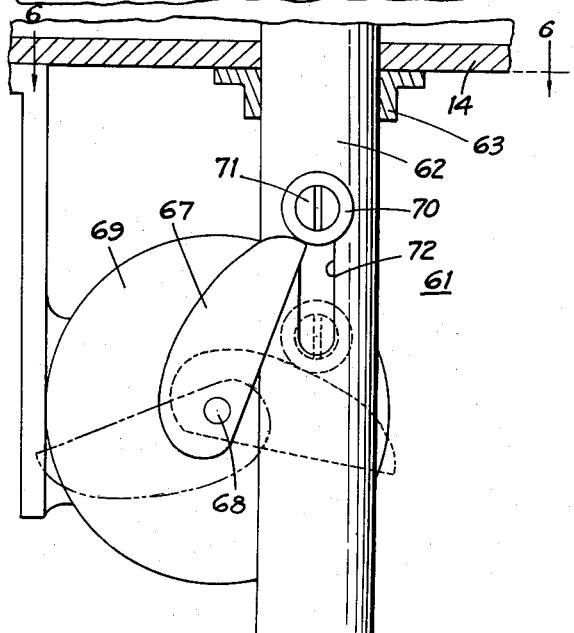
Fig. 5 is an enlarged view showing details of construction of a capsule-agitating mechanism which forms a part of the machine, various positions of a cam which forms a part thereof, being shown in full lines, dotted lines, and double-dot-dash lines.

In Figs. 1–3 is shown a machine which has an elongated main portion or tunnel 10 having side walls 12 and 13, a bottom wall 14, and a top wall 15 (see Fig. 3). The walls of the tunnel 10 are formed of aluminum or stainless steel, or other metal which is unaffected by formaldehyde and water vapor. The tunnel is supported on appropriate legs 16. Angle-shaped tracks 17 and 18 are attached to side walls 12 and 13, respectively, in any suitable manner (not shown) and extend the length of the tunnel. The tracks support a plurality of trays 19, which can be slid along the tunnel. As shown in Fig. 4, each of the trays 19 includes a box-like rectangular framework consisting of side frames 21 and end frames 22 which support a screen section 23. The screen section 23 forms the bottom of the tray. As shown in Fig. 5, capsules 24 are supported on the screen. Each of the capsules is of usual form and includes a hollow shell 25 of gelatin inside which is a medicament 25a. The screen is attached to the side and end frames 21 and 22 by molding members 26 and 27 (Fig. 4), respectively, which hold the screen section in place. Rigid brace members 28 and 29 span the moldings 21 and 22, respectively, as shown most clearly in Fig. 4 and cross at the center of the bottom of the tray spaced below the screen as shown in Fig. 5.

As shown in Fig. 1, the trays can be inserted at one end of the tunnel through a door 31, and each tray is moved along the tunnel when another tray is inserted through the door 31. The door 31 is mounted on hinges 30, and can swing to the left as shown in Figs. 1 and 2 to open position. An appropriate catch (not shown) holds the door in closed position.

The tunnel is divided into an inlet or entry section 32, a main section 33, and an outlet or discharge section 34 as shown in Fig. 1. The inlet section 32 is separated from the main section 33 by an upper wall section 36 and a lower wall section 37. The lower wall section 37 extends upwardly from the bottom wall of the tunnel to substantially the bottoms of trays on the tracks 17 and 18. The upper wall section 36 carries a flap 38 of rubber, or the like, which hangs downwardly therefrom. As shown in Fig. 1, the lower edge of the flap 38 engages the upper edge of one of the end frames 22 of one of the trays when the trays are at rest inside the tunnel in the position shown in Fig. 1 to form a substantially tight air lock between the inlet section and the main section. Similarly, an air lock is formed between the main section and the outlet section by a lower wall section 41 and an upper wall section 42. The upper wall section 42 carries a rubber flap 43, as shown most clearly in Fig. 3. An additional air lock is provided in the outlet section by lower and upper wall sections indicated at 44 and 46, respectively, and a flap 47. When a tray has traveled the length of the tunnel, the tray can be removed therefrom through a door 49 which can swing to the right as shown in Figs. 1 and 2 on hinges 51. An appropriate catch (not shown) holds the door 49 in closed position.

Chemical containers 52, 53, and 54 are mounted in the tunnel below the tracks 17 and 18. The container 52 is in the inlet section, and the containers 53 and 54 are in the main section of the tunnel. The container 52 is loaded with calcium chloride which acts as a desiccant removing moisture from the air entering with the capsules into the inlet section so that moisture is eliminated from the air surrounding the capsules before the capsules enter the main section of the tunnel and in order to eliminate effects caused by variations in the humidity of the ambient air.

The containers 53 and 54 are located inside the main section of the tunnel. The containers 53 contain an aqueous solution of formaldehyde. The containers 54 contain a concentrated aqueous solution of selected salts for maintaining a predetermined relative humidity inside the main section of the tunnel. In the preferred operation of the tunnel, the containers 53 contain commercial formaldehyde solution which is approximately at 37% aqueous solution of formaldehyde, and the containers 54 contain a mixture of sodium nitrate, sodium chloride, and potassium nitrate, together with a concentrated aqueous solution of these salts. The salt solution controls the humidity in the main section of the tunnel so that the relative humidity therein is approximately 30%.

The solutions in the containers 53 and 54 may be replenished, when necessary, by means of filler containers 56 and 57. The filler container 56 is connected to the formaldehyde containers 53 by a line 58 and the filler container 57 is connected to the salt solution containers 54 by a line 59 as shown in Fig. 2. When the supply of salt solution in the salt solution container is depleted, water may be added to the filler container 57 to flow through the line 59 to the salt solution containers 54. When the supply of formaldehyde solution in the containers 53 is depleted, additional formaldehyde solution is added to the filler container 56 to flow through the line 58 to the formaldehyde containers 53.

When the tunnel is to be used, empty trays are inserted into the tunnel until there is a complete set of empty trays extending the length thereof. Then a tray is loaded with capsules. For best results, there are no more than two or three layers of capsules in the tray resting on the screening thereof. The inlet door 31 is opened and the loaded tray is advanced into the inlet chamber, where the tray remains with the door closed for sufficient time to dry the air surrounding the capsules. Then, as additional trays are inserted into the tunnel, the loaded tray is advanced therealong into the main section of the tunnel where capsules in the loaded tray are exposed to vapors of formaldehyde having a controlled humidity.

Figure 6:
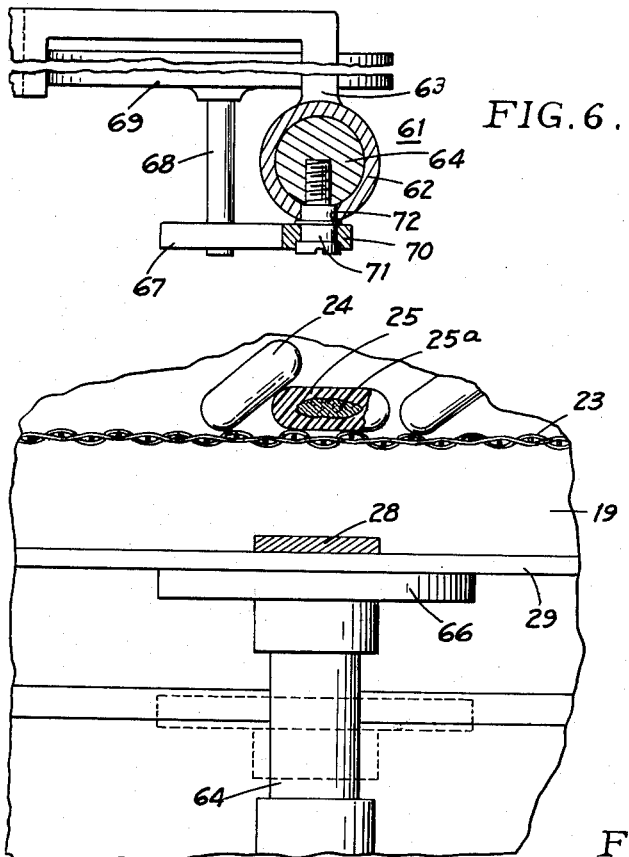
Fig. 6 is a view in section taken on the line 6—6 in Fig. 5, an agitator shaft and members mounted thereon being further broken away.

When the loaded tray reaches approximately the center of the tunnel, the loaded tray is raised and dropped by an agitating mechanism 61. Details of the agitating mechanism 61 are shown in Figs. 5 and 6. A tubular guide 62 extends through the bottom wall 14 of the tunnel and is attached thereto by an appropriate bracket 63. A shaft 64 moves up and down inside the guide 62. A plate 66 at the upper end of the shaft 64 is engageable with the middle portion of the lengthwise brace 29 of the tray thereabove when the trays are stationary in the position shown in Figs. 1 and 2. The shaft is raised by operation of a cam 67. The cam 67 is mounted on a cam shaft 68 which is driven by an electric motor 69. The cam engages a ring bearing 70 which is rotatably mounted on a pin or stud 71. The stud 71 in turn is mounted in the agitator shaft 64 and reciprocates in a slot 72 in the guide 62.

As the cam shaft and cam swing from the position shown in dashed lines to the position shown in full lines, the cam raises the shaft 64 to raise the tray thereabove. Then, when the cam swings farther in a counter-clockwise direction, the cam comes out from beneath the ring bearing and the agitator shaft 64 and the tray thereabove is dropped suddenly to cause agitation of the capsules in the tray.

The electric motor may be connected to an appropriate source of power through appropriate switches (not shown). When a loaded tray has been pushed to the position above the guide, the motor may be energized for a sufficient time to cause the tray to be raised and dropped one or more times. Then, when the cam has reached the position shown in double-dot-dash lines, the motor may be stopped until another tray is inserted to advance each tray in the tunnel one tray length.

In the operation of the tunnel, at predetermined time intervals trays filled with capsules are loaded into the tunnel. As each tray is inserted, another tray is removed from the outlet lend. The timing or interval of time between introduction of trays, varies with the capsules treated. For an average type of capsule, the time of exposure in the main section of the tunnel is about one hour. However, since the consistency of the gelatin of capsules varies, the required time may vary and is determined by testing a small sample of capsules from a batch to determine the length of exposure necessary to result in the desired hardening and enteric coating. The capsules of the batch are tested by reaction with artificial gastric juices and artificial intestinal fluid. In testing a batch, a sample of capsules is exposed to the fumes in the main section of the tunnel for one hour. Then, after removal from the tunnel, portions of the sample are allowed to stand for periods of one, two, four, six, eight and ten days. Results of testing one sample batch are shown in the following table:

| Artificial gastric juice: | Artificial intestinal fluid |
|---|---|
| 1st day disintegrate in 20 minutes. | |
| 2nd day disintegrate in 45 minutes. | |
| 4th day no disintegration in 1 hr. | Disintegrates in 2 hrs. |
| 6th day no disintegration in 1 hr. | Disintegrates in 2½ hrs. |
| 8th day no disintegration in 1 hr. | Disintegrates in 2½ hrs. |
| 10th day no disintegration in 1 hr. | Disintegrates in 2½ hrs. |

The tabulated results indicate that after six days, the reaction had terminated and a stable coating had been achieved. If, in another sample batch, substantially more than 2½ hrs. is required to cause disintegration in artificial intestinal fluid, an additional sample batch is prepared using a shorter period of exposure to fumes in the main section of the tunnel. Where, on the other hand, in a sample batch, there is disintegration in artificial gastric juices within less than 1 hour, even after six or more days, an additional batch is given a longer period of exposure in the main section of the tunnel before testing.

In the usual batches of capsules the time required in the main section of the tunnel to produce a stable enteric coating, varies from 15 minutes to 2 hours.

The humidity inside the tunnel may be varied by using other salt solutions for controlling the humidity.

If much greater humidity is employed, however, the reaction process is at a faster rate and can not readily be controlled. If, on the other hand, a lower humidity is employed, the reaction is substantially slower.

The treated capsules are strongly resistant to deterioration or "leaking" even at elevated temperatures which cause leaking of ordinary or untreated capsules.

The method and device for hardening and enteric coating capsules described above and illustrated in the drawings, are subject to modification without departing from the spirit and scope of the appended claims.

Having described my invention, what I claim as new and desire to secure by Letters Patent is:

1. A machine for hardening the surface of gelatin capsules which comprises an elongated, enclosed tunnel having an inlet section, a main section, and an outlet section, means for supporting a plurality of trays in said tunnel for advancing therethrough, means for substantially sealing the inlet and outlet sections from the main section, a desiccant in the inlet section for drying the air therein, open-topped containers in the main section, formaldehyde solution in at least one of said containers, a humidity controlling solution in at least another of said containers, whereby an atmosphere of predetermined humidity and concentration of formaldehyde is maintained in the main section of the tunnel for forming a coating on gelatin capsules held in said trays as the trays are moved through the tunnel, and means for agitating the trays when in the main section to stir capsules in the trays.

2. A machine for hardening the surface of gelatin capsules which comprises an elongated, enclosed tunnel having an inlet section, a main section, and an outlet section, tracks extending along opposite sides thereof for supporting a plurality of trays in said tunnel for advancing therethrough, each of said trays having a screen bottom, means for substantially sealing the inlet and outlet sections from the main section, a desiccant in the inlet section for drying the air therein, open-topped containers in the main section below the tracks, formaldehyde solution in at least one of said containers, a humidity controlling solution in at least another of said containers, whereby an atmosphere of predetermined humidity and concentration of formaldehyde is maintained in the main section of the tunnel for forming a coating on gelatin capsules held in said trays as the trays are moved through the tunnel, a shaft reciprocably mounted for up and down motion through the bottom of the main section of the tunnel between the tracks, and engageable with one of the trays on the tracks, and means engageable with the shaft to raise the shaft and said one of the trays to cause said one of the trays to drop to the tracks to stir the capsules in said one of the trays.

3. A machine for hardening the surface of gelatin capsules which comprises an elongated, enclosed tunnel having an inlet section, a main section, and an outlet section, means for supporting a plurality of trays in said tunnel for advancing therethrough, means for substantially sealing the inlet and outlet sections from the main section, open-topped containers in the tunnel, formaldehyde solution in at least one of said containers, a humidity controlling solution in at least another of said containers, whereby an atmosphere of predetermined humidity and concentration of formaldehyde is maintained in the main section of the tunnel for forming a coating on gelatin capsules held in said trays as the trays are moved through the tunnel, and means for agitating the trays when in the tunnel to stir capsules in the trays.

4. A machine for hardening the surface of gelatin capsules which comprises an elongated, enclosed tunnel, means for supporting a plurality of trays in said tunnel for advancing therethrough, means for substantially sealing ends of the tunnel, open-topped containers in the tunnel, formaldehyde solution in at least one of said containers, a humidity controlling solution in at least another of said containers, whereby an atmosphere of predetermined humidity and concentration of formaldehyde is maintained in the tunnel for forming a coating on gelatin capsules held in said trays as the trays are moved through the tunnel, and means for agitating the trays when in the tunnel to stir capsules in the trays.

5. A machine for hardening the surface of gelatin capsules which comprises an elongated, enclosed tunnel, means for supporting a plurality of trays in said tunnel for advancing therethrough, means for substantially sealing ends of the tunnel, an open-topped container in the tunnel, formaldehyde solution in said container, whereby an atmosphere of predetermined concentration of formaldehyde is maintained in the tunnel for forming a coating on gelatin capsules held in said trays as the trays are moved through the tunnel, and means for agitating the trays when in the tunnel to stir capsules when in the trays.

References Cited in the file of this patent

UNITED STATES PATENTS

| | | |
|---|---|---|
| 1,230,068 | Elliott | June 12, 1917 |
| 1,710,747 | Smith | Apr. 30, 1929 |
| 1,744,884 | Greiner | Jan. 28, 1930 |
| 1,916,455 | Wright | July 4, 1933 |
| 1,938,581 | Cope et al. | Dec. 12, 1933 |
| 2,511,666 | Barr | June 13, 1950 |
| 2,519,250 | Jeppson et al. | Aug. 15, 1950 |

FOREIGN PATENTS

| | | |
|---|---|---|
| 514,047 | Great Britain | Oct. 30, 1939 |
| 470,045 | Canada | Dec. 12, 1950 |